US011514605B2

(12) United States Patent
Zhang et al.

(10) Patent No.: US 11,514,605 B2
(45) Date of Patent: Nov. 29, 2022

(54) COMPUTER AUTOMATED INTERACTIVE ACTIVITY RECOGNITION BASED ON KEYPOINT DETECTION

(71) Applicant: International Business Machines Corporation, Armonk, NY (US)

(72) Inventors: Dan Zhang, Beijing (CN); Hong Bing Zhang, Beijing (CN); Chao Xin, Ningbo (CN); Xue Ping Liu, Beijing (CN); Zhi Xing Peng, Beijing (CN); Zhuo Cai, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 253 days.

(21) Appl. No.: 17/035,722

(22) Filed: Sep. 29, 2020

(65) Prior Publication Data

US 2022/0101556 A1    Mar. 31, 2022

(51) Int. Cl.
*G06T 7/73*          (2017.01)
*G06K 9/62*          (2022.01)
(Continued)

(52) U.S. Cl.
CPC .............. *G06T 7/75* (2017.01); *G06K 9/6267* (2013.01); *G06N 3/04* (2013.01); *G06N 3/08* (2013.01)

(58) Field of Classification Search
CPC ........ G06K 9/6267; G06N 20/00; G06N 3/04; G06N 3/0454; G06N 3/08; G06T 7/75
See application file for complete search history.

(56) References Cited

U.S. PATENT DOCUMENTS 10,503,978 B2   12/2019   Kadav
10,572,723 B2    2/2020   Jiang
(Continued)

FOREIGN PATENT DOCUMENTS

CN    103345627 B   3/2016
CN    105930767 A   9/2016
(Continued)

OTHER PUBLICATIONS

Zhengyuan Yang, "Action Recognition With Spatio—Temporal Visual Attention on Skeleton Image Sequences," Aug. 7, 2018,IEEE Transactions on Circuits and Systems for Video Technology (vol. 29, Issue: 8, Aug. 2019), pp. 2405-2013.*
(Continued)

*Primary Examiner* — Omar S Ismail
(74) *Attorney, Agent, or Firm* — Michael A. Petrocelli (57) ABSTRACT

Computer automated interactive activity recognition based on keypoint detection includes retrieving, by one or more processors, a temporal sequence of image frames from a video recording. The one or more processors identify first and second keypoints in each of the image frames in the temporal sequence using machine learning techniques. The first keypoints are associated with an object in the temporal sequence of image frames while the second keypoints are associated with an individual interacting with the object. The one or more processors combine the first keypoints with the second keypoints and extract spatial-temporal features from the combination that are used to train a classification model based on which interactive activities can be recognized.

20 Claims, 7 Drawing Sheets

(51) Int. Cl.
*G06N 3/04* (2006.01)
*G06N 3/08* (2006.01)

(56) References Cited

U.S. PATENT DOCUMENTS

| | | | | |
|---|---|---|---|---|
| 2015/0243038 | A1* | 8/2015 | Zhao | G06V 10/462 |
| | | | | 382/103 |
| 2019/0172223 | A1* | 6/2019 | Vajda | G06K 9/623 |
| 2019/0172224 | A1* | 6/2019 | Vajda | G06N 3/084 |
| 2019/0213406 | A1* | 7/2019 | Porikli | G06V 40/113 |
| 2019/0286892 | A1 | 9/2019 | Li | |
| 2020/0020165 | A1* | 1/2020 | Tran | G06N 20/10 |
| 2020/0184846 | A1* | 6/2020 | Zhang | G06N 3/08 |
| 2020/0298080 | A1* | 9/2020 | Zhang | G06T 7/20 |
| 2020/0302180 | A1 | 9/2020 | Zhang | |
| 2021/0097266 | A1* | 4/2021 | Mangalam | G06V 20/58 |
| 2021/0271866 | A1* | 9/2021 | Hayakawa | G06V 10/454 |
| 2021/0312321 | A1* | 10/2021 | Deng | G06N 3/08 |

FOREIGN PATENT DOCUMENTS

| | | |
|---|---|---|
| CN | 107239728 A | 10/2017 |
| CN | 106022213 B | 6/2019 |
| CN | 110569795 A | 12/2019 |
| EP | 3467707 A1 | 4/2019 |
| JP | 2018538631 A | 12/2018 |
| WO | 2018126323 A1 | 7/2018 |

OTHER PUBLICATIONS

Yaadhav Raaj,"Efficient Online Multi-Person 2D Pose Tracking with Recurrent Spatio-Temporal Affinity Fields",Jun. 2019,Proceedings of the IEEE/CVF Conference on Computer Vision and Pattern Recognition (CVPR), 2019, pp. 4620-4627.*

Yujun Cai,"Exploiting Spatial-temporal Relationships for 3D Pose Estimation via Graph Convolutional Networks," Oct. 2019, Proceedings of the IEEE/CVF International Conference on Computer Vision (ICCV), 2019,pp. 2272-2279.*

Huy Hieu Pham,"Spatio-Temporal Image Representation of 3D Skeletal Movements for View-Invariant Action Recognition with Deep Convolutional Neural Networks,"Apr. 24, 2019,Sensors 2019, 19, 1932; doi:10.3390/s19081932,pp. 1-15.*

International Search Report and Written Opinion, International Application No. PCT/CN2021/106777, dated Oct. 20, 2021, 8 pages.

Mell et al., "The NIST Definition of Cloud Computing", National Institute of Standards and Technology, Special Publication 800-145, Sep. 2011, 7 pages.

* cited by examiner

COMPUTER AUTOMATED INTERACTIVE ACTIVITY RECOGNITION BASED ON KEYPOINT DETECTION

BACKGROUND

The present invention generally relates to the field of artificial intelligence (AI), and more particularly to a method, system and computer program product for automated interactive activity recognition based on keypoint detection using machine learning techniques.

Interactive activity recognition systems are important for computers to understand the behavior of people in pictures or videos. These systems can be used in many areas. For example, in manufacturing and maintenance processes, interactive activity recognition systems can be implemented to improve the use of certain machines by identifying operational mistakes. However, interactive activity between humans and objects is complex, and recognizing the actions involved can be a challenging task.

SUMMARY

Shortcomings of the prior art are overcome and additional advantages are provided through the provision of a method for interactive activity recognition. The method includes retrieving, by one or more processors, a temporal sequence of image frames from a video recording, identifying, by the one or more processors, first keypoints and second key points in each of the image frames in the temporal sequence. The first keypoints are associated with an object in the temporal sequence of image frames while the second keypoints are associated with an individual interacting with the object. The one or more processors combine the first keypoints with the second keypoints and extract spatial-temporal features from the combined first keypoints and second keypoints. Based on the extracted spatial-temporal features, the one or more processors train a classification model for recognition of interactive activities between the individual and the object.

Another embodiment of the present disclosure provides a computer program product for interactive activity recognition, based on the method described above.

Another embodiment of the present disclosure provides a computer system for interactive activity recognition, based on the method described above.

BRIEF DESCRIPTION OF THE DRAWINGS

The following detailed description, given by way of example and not intended to limit the invention solely thereto, will best be appreciated in conjunction with the accompanying drawings, in which.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

The recognition of complex interactive activities performed by humans plays an important role in many applications, such as monitoring systems for human-robot interaction, security, sport biomechanics, etc. Interactive activity recognition systems must be capable of automatically analyzing daily activities and detecting human interaction with machines that may be undesirable in order to provide an appropriate response. Such undesirable interactions can include interactions which can be dangerous, for example, when a human is operating machinery.

Many of those applications may benefit from spatial localization of features of interest. These features of interest are frequently referred to as "keypoints". Keypoint detection typically involves simultaneous detection of spatial locations or points in an image that define features of interest, or noticeable features in the image at a given time (i.e., spatial-temporal features). Desirable properties of keypoint detection may include accurate localization, invariance against shift, rotation, scale, brightness changes, robustness against noise, high repeatability, and so on.

However, humans interact daily with different types of objects in different ways depending on their intentions (e.g., work to be performed, etc.), thereby making the detection and recognition of the performed interactive activities a very challenging task.

Therefore, embodiments of the present invention provide a method, system, and computer program product for automatically recognizing interactive activities based on keypoint detection. The following described exemplary embodiments provide a system, method, and computer program product to, among other things, capture a sequence of image frames from a video recording, detect keypoints associated with the interactive activities in each of the image frames using machine learning techniques, combine the detected keypoints (e.g., object keypoints and human keypoints), use the combined keypoints as input for a graph convolutional network used to determine spatial-temporal features, and use the determined spatial-temporal features to train a classification model based on which interactive activities can be recognized and classified.

Thus, the present embodiments have the capacity to improve the technical field of artificial intelligence by providing a system and computer-implemented method that automatically recognizes and classifies interactive activities from available video recordings using deep learning algorithms. The present embodiments may accurately recognize interactions between humans and specific objects to determine actions that could be improved. For example, an equipment in a manufacturing facility that is being operated incorrectly, may cause an operational or safety hazard. Another example may include physical movement analysis in relation to a sport to optimize a player's skills or techniques. In both situations, the proposed method for automated interactive activity recognition, prior user's authorization, can collect and analyze data to detect human mechanics which are less than optimal, and generate a notification based on which corrective actions can be taken.

Figure 1:
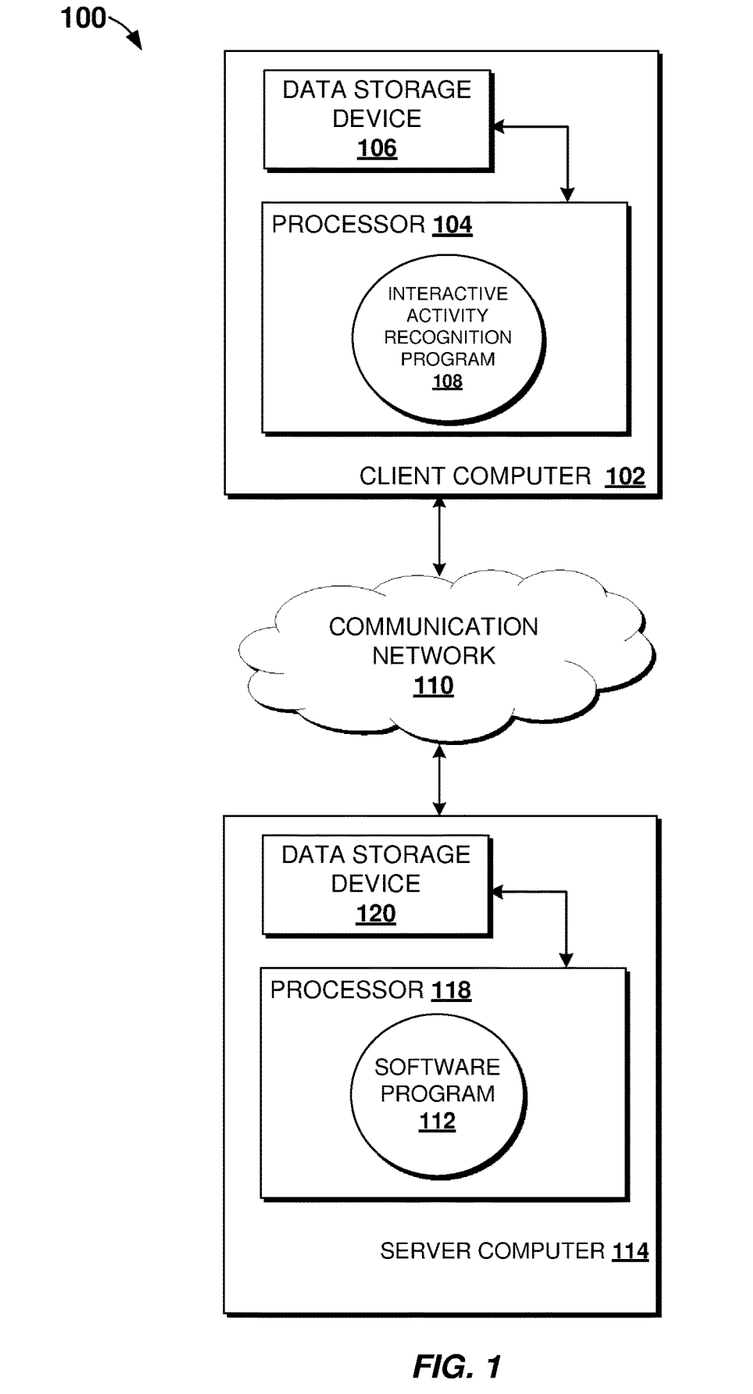
FIG. 1 is a block diagram illustrating a networked computer environment, according to an embodiment of the present disclosure.

Referring now to FIG. 1, an exemplary networked computer environment 100 is depicted, according to an embodiment of the present disclosure. FIG. 1 provides only an illustration of one embodiment and does not imply any limitations with regard to the environments in which different embodiments may be implemented. Many modifications to the depicted environment may be made by those skilled in the art without departing from the scope of the invention, as recited by the claims.

The networked computer environment 100 may include a client computer 102 and a communication network 110. The client computer 102 may include a data storage device 106a and a processor 104 that is enabled to run an interactive activity recognition program 108. Client computer 102 may be, for example, a mobile device, a telephone (including smartphones), a personal digital assistant, a netbook, a laptop computer, a tablet computer, a desktop computer, or any type of computing devices capable of accessing a network.

The networked computer environment 100 may also include a server computer 114 with a data storage device 120 and a processor 118 that is enabled to run a software program 112. In some embodiments, server computer 114 may be a resource management server, a web server or any other electronic device capable of receiving and sending data. In another embodiment, server computer 114 may represent a server computing system utilizing multiple computers as a server system, such as in a cloud computing environment.

The interactive activity recognition program 108 running on client computer 102 may communicate with the software program 112 running on server computer 114 via the communication network 110. As will be discussed with reference to FIG. 4, client computer 102 and server computer 114 may include internal components and external components.

The networked computer environment 100 may include a plurality of client computers 102 and server computers 114, only one of which is shown. The communication network 110 may include various types of communication networks, such as a local area network (LAN), a wide area network (WAN), such as the Internet, the public switched telephone network (PSTN), a cellular or mobile data network (e.g., wireless Internet provided by a third or fourth generation of mobile phone mobile communication), a private branch exchange (PBX), any combination thereof, or any combination of connections and protocols that will support communications between client computer 102 and server computer 114, in accordance with embodiments of the present disclosure. The communication network 110 may include wired, wireless or fiber optic connections. As known by those skilled in the art, the networked computer environment 100 may include additional computing devices, servers or other devices not shown.

Plural instances may be provided for components, operations, or structures described herein as a single instance. Boundaries between various components, operations, and data stores are somewhat arbitrary, and particular operations are illustrated in the context of specific illustrative configurations. Other allocations of functionality are envisioned and may fall within the scope of the present invention. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the present invention.

Figure 2A:
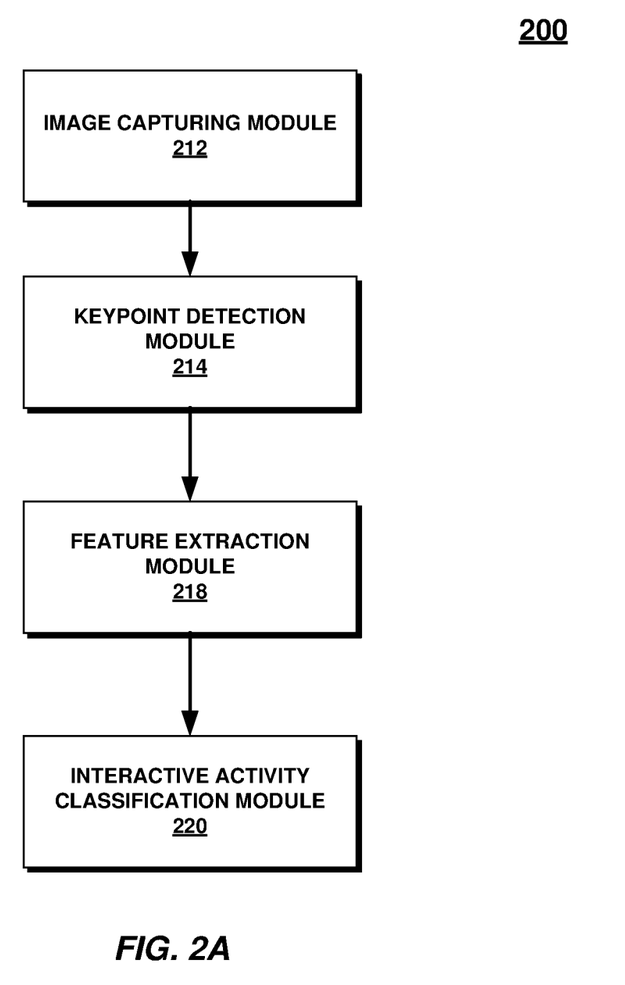
FIG. 2A depicts a system for automated interactive activity recognition based on keypoint detection, according to an embodiment of the present disclosure.
Figure 2B:
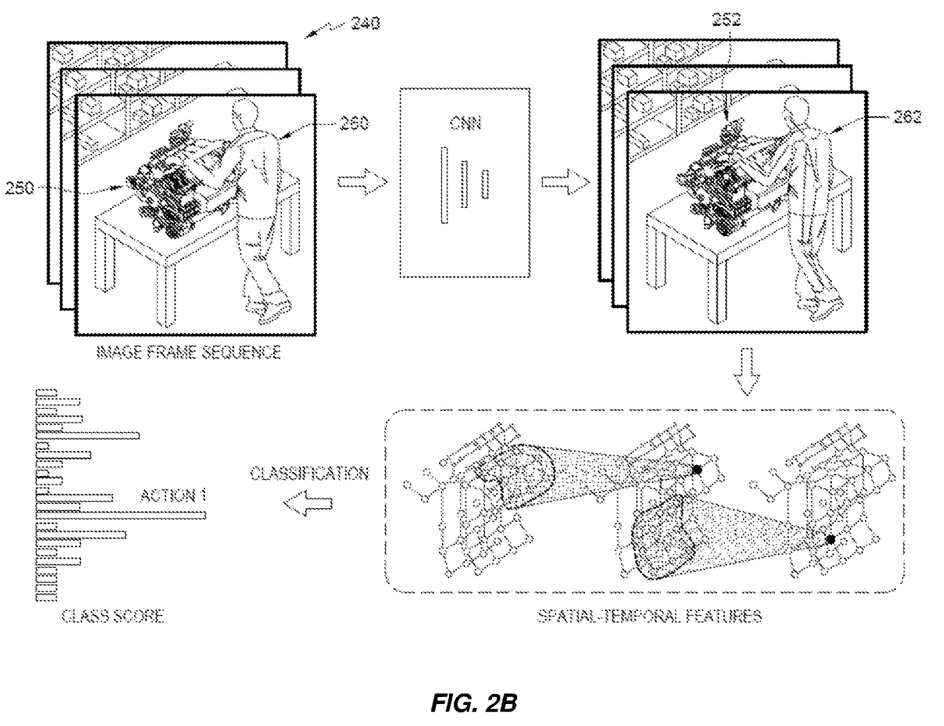
FIG. 2B depicts an example implementation of the system for automated interactive activity recognition based on keypoint detection of FIG. 2A, according to an embodiment of the present disclosure.

Referring now to FIG. 2A, a system 200 for automated interactive activity recognition based on keypoint detection is shown, according to an embodiment of the present disclosure. FIG. 2B is an example implementation of the system 200 that will be explained simultaneously with FIG. 2A.

According to an embodiment, the system 200 for automated interactive activity recognition includes an image capturing module 212, a keypoint detection module 214, a feature extraction module 218, and an interactive activity classification module 220. The image capturing module 212 captures videos or images from an optical instrument. In an embodiment, the optical instrument can be, for example, a video camera. Specifically, the image capturing module 212 is capable of retrieving a sequence of image frames 240 (FIG. 2B) from a video recording captured by the optical instrument (not shown). The process of retrieving the sequence of image frames 240 from the recorded video can be performed using any known image processing tool. For example, the sequence of image frames 240 can be retrieved using a software library such as OpenCV© (Open Source Computer Vision Library) which converts images into multi-dimensional arrays.

It should be noted that any data collection (e.g., pictures, videos, etc.) is done with users consent via an opt-in and opt-out feature. As known by those skilled in the art, an opt-in and opt-out feature generally relates to methods by which the user can modify a participating status (i.e., accept or reject the data collection). In some embodiments, the opt-in and opt-out feature can include a software application(s) available in the client computer 102. Additionally, users can choose to stop having his/her information being collected or used. In some embodiments, the users can be notified each time data is being collected. The collected data is envisioned to be secured and not shared with anyone without users consent. The users can stop the data collection at any time.

After extracting the sequence of image frames 240 from the video, the keypoint detection module 214 identifies features or points of interest (i.e., keypoints) associated with humans and objects present in the sequence of image frames 240. Specifically, the keypoint detection module identifies keypoints associated with an object 250 in each image frame from the retrieved sequence of image frames 240. Subsequently, the keypoint detection module 214 identifies keypoints associated with a human (or individual) 260 in each image frame from the retrieved sequence of image frames 240.

According to an embodiment, object keypoints 252 can be determined using a Convolutional Neural Network (CNN) trained in advanced for determining object points of interest. As known by those skilled in the art, CNN is a class of deep learning neural networks for image recognition and classification capable of analyzing an input (i.e., image) and outputting a class or a probability that the input is a particular class. In an embodiment, CNN-based real-time object detection models such as YOLO© (You Only Look Once) and/or Faster R-CNN© can be used to detect a bounding box of the specific objects (e.g., object 250) in the sequence of image frames 240 and identify object keypoints 252. Pre-labeled data can be used to train the CNN-based detection models for identifying object keypoints.

Similarly, human keypoints 262 can be determined using existing technologies. For example, the human keypoints 262 can be determined using real-time methods for multi-person pose detection in images and videos such as OpenPose©. As known by those skilled in the art, these real-time multi-person detection methods can jointly detect human body, hand, facial, and foot key-points on single images.

In some cases, sheltered keypoints can be present (e.g., keypoints difficult to see or not captured by the camera) in the sequence of image frames 240 and go unnoticed by traditional keypoint determination systems. To avoid this problem, the system 200 use front and back of each image frame in the sequence of image frames 240 to determine existing sheltered (human or object) keypoints. Particularly, the keypoint detection module uses tracking algorithms in the keypoint detection process to determine a relationship between the $n^{th}$ and $(n+1)^{th}$ frames in the sequence of image frames 240. When a human or object keypoint is sheltered in the $(n+1)^{th}$ frame, a position of the sheltered keypoint can be determined based on a position of the same keypoint in the $n^{th}$ frame in which the keypoint is visible or unblocked.

Object keypoints 252 and human keypoints 262 are combined and used as input for the feature extraction module 218. The feature extraction module 218 consists of a Graph Convolutional Neural Network (GCN) that extracts spatial-temporal features that can be used to train a classification model of the interactive activity classification module 220. The spatial-temporal features are associated with data collected across both space and time corresponding to the determined object and human keypoints 252, 262, respectively.

As known by those skilled in the art, GCNs provide an image classification method including a very powerful neural network architecture for machine learning on graphs. Particularly, GCNs perform a convolution on a graph, instead of on an image composed of pixels. For example, the CNN model extracts the most important information from the sequence of image frames 240 to classify the sequence, the GCN model passes a filter over the graph, looking for essential vertices and edges (i.e., keypoints) that can help classify nodes within the graph. Specifically, the GCN model can handle non Euclidean Structure data (e.g., images) more efficiently, and is capable of providing more application space on topological connection data structures. The result from the GCN model includes final object and human keypoints that will be used as input for the classification model of the interactive activity classification module 220.

The extracted spatial-temporal features are inputted to the classification model of the interactive activity classification module 220. According to an embodiment, the interactive activity classification module 220 outputs or produces an optimal classification for interaction(s) between human and objects based on the extracted spatial-temporal features. The classification model of the interactive activity classification module 220 uses a supervised learning algorithm that learns from the input data (i.e., spatial-temporal features associated with keypoints extracted from the sequence of image frames 240) and then uses this learning to classify new interactive activity between humans and objects.

In some embodiments, based on training datasets, the classification model of the interactive activity classification module 220 can recognize unwanted interactive activities between human and objects, and generate an alert notifying about the unusual interactive action.

Figure 3:
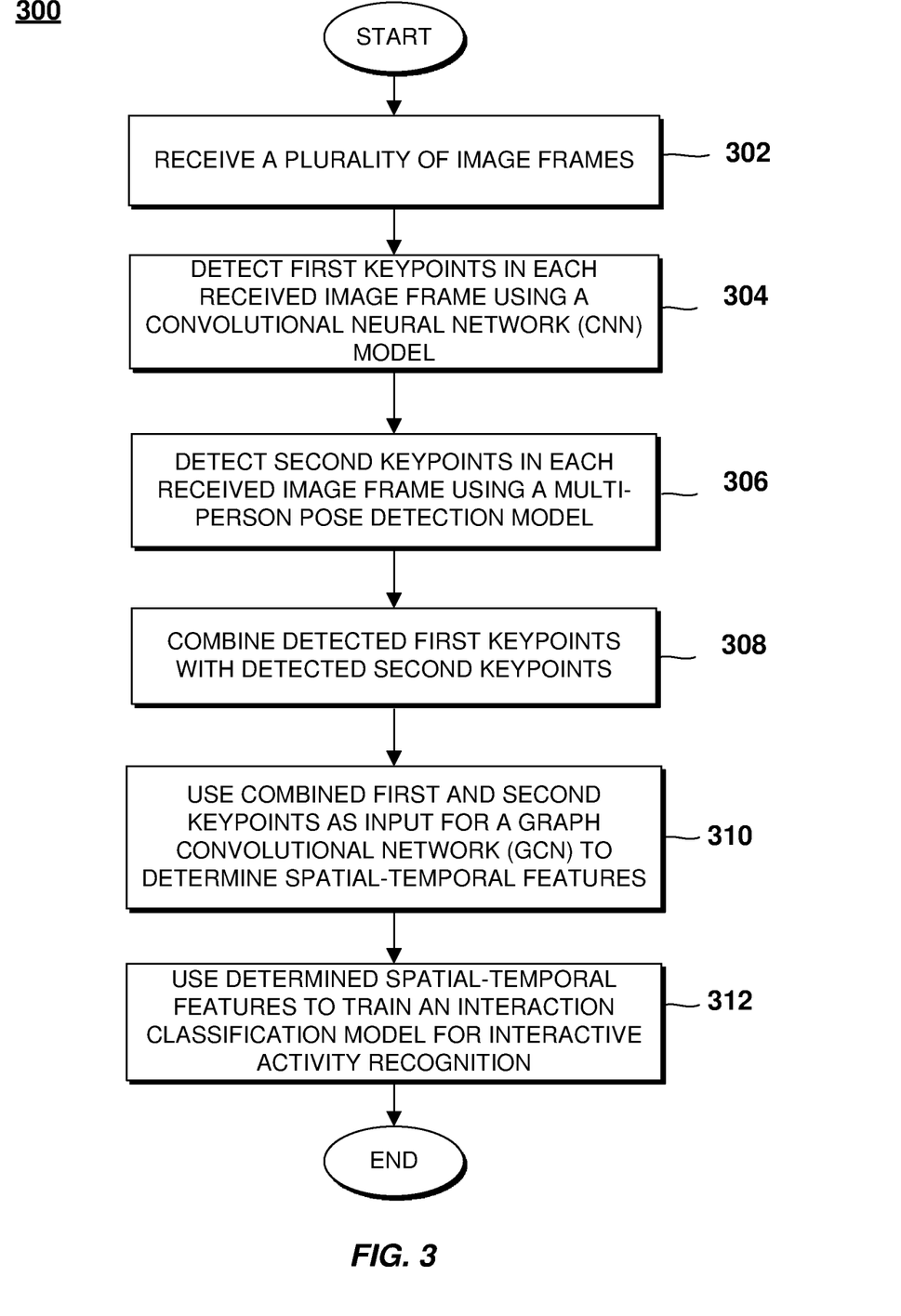
FIG. 3 depicts a flowchart illustrating the steps of a computer-implemented method for automated interactive activity recognition based on keypoint detection, according to an embodiment of the present disclosure.

Referring now to FIG. 3, a flowchart illustrating the steps of a computer-implemented method for automated interactive activity recognition based on keypoint detection is shown, according to an embodiment of the present disclosure.

The process starts at step 302 by receiving a plurality of image frames. As explained above, the plurality of image frames corresponds to a sequence of image frames extracted from a video recording. At step 304, first keypoints corresponding to points of interests associated with an object (e.g., object 250 and object keypoints 252 of FIG. 2B) are detected using a CNN-based model. According to an embodiment, the CNN-based model has been previously trained for recognizing the first (object) keypoints.

Similarly, at step 306, second keypoints corresponding to points of interests associated with a human or individual interacting with the object are detected in the received plurality of images frames. The second or human keypoints are detected using current real-time methods for multi-person pose detection in images and videos.

In embodiments in which sheltered or hidden keypoints are present, the proposed method uses front and back of each image frame to determine existing sheltered (human and/or object) keypoints, as explained above with reference to FIG. 2A.

At step 308, first (object) keypoints and second (human) keypoints are combined and used as input, at step 310, for the GCN model of the feature extraction module 218 of FIG. 2A. Specifically, at step 308, a predetermined time window N is set, and first and second keypoints corresponding to that time window N are selected and combined to be used as input for the GCN model at step 310. An output of the GCN model, for the corresponding time window N, may then then be used to train a classification model (e.g., classification model of the interactive activity classification module 220 of FIG. 2A). Based on the trained classification model recognition of interactive activities between human and objects can be performed at step 312. Sated differently, the output (i.e., relevant spatial-temporal features of combined keypoints) of the GCN model is used to feed the (interaction) classification model, as described above with reference to FIG. 2A.

In some embodiments, based on recognizing an interactive activity as unwanted or less than optimal, the proposed method can generate an alert notifying of the detected unusual interaction between human and object. This may be particularly helpful in manufacturing processes or security systems.

Therefore, embodiments of the present invention provide a method, system, and computer program product for recognizing and classifying interactive activities between humans and objects based on keypoints detected from a temporal sequence of image frames. Machine learning algorithms are used in the proposed embodiments to accurately recognize and classify human and object keypoints which can then be used to train a classification model for interactive activity recognition. The proposed embodiments can be useful for numerous practical applications in which recognition of activities between humans and objects is required, including manufacturing processes, security systems, maintenance systems, and the like.

Figure 4:
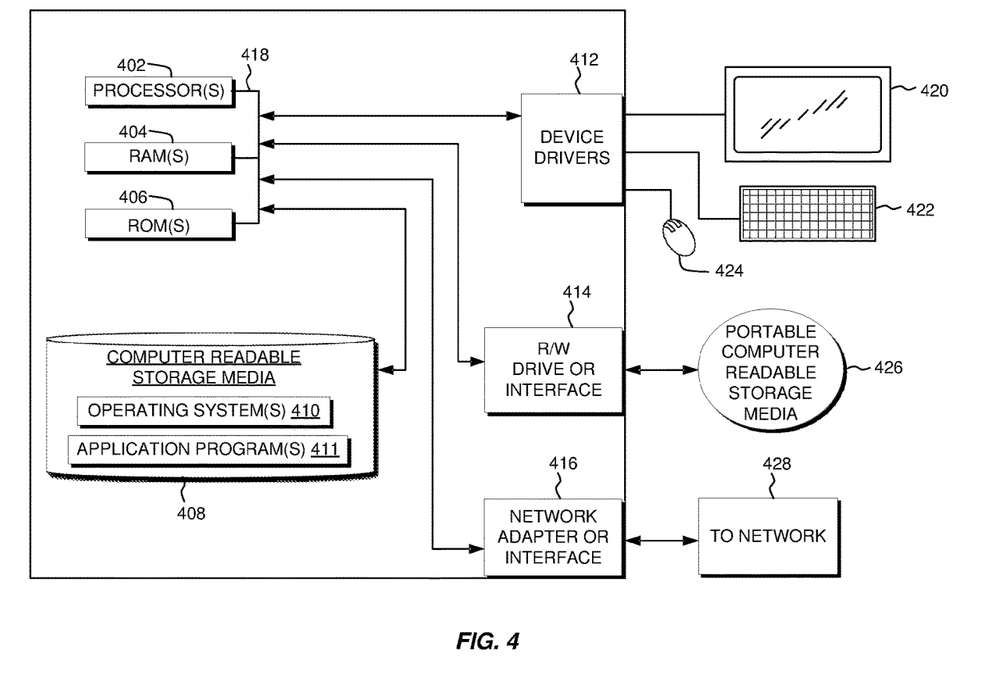
FIG. 4 is a block diagram of internal and external components of a computer system, according to an embodiment of the present disclosure.

Referring now to FIG. 4, a block diagram of components of client computer 102 and server computer 114 of networked computer environment 100 of FIG. 1 is shown, according to an embodiment of the present disclosure. It should be appreciated that FIG. 4 provides only an illustration of one implementation and does not imply any limitations regarding the environments in which different embodiments may be implemented. Many modifications to the depicted environment may be made.

Client computer 102 and server computer 114 may include one or more processors 402, one or more computer-readable RAMs 404, one or more computer-readable ROMs 406, one or more computer readable storage media 408, device drivers 412, read/write drive or interface 414, network adapter or interface 416, all interconnected over a communications fabric 418. Communications fabric 418 may be implemented with any architecture designed for passing data and/or control information between processors (such as microprocessors, communications and network processors, etc.), system memory, peripheral devices, and any other hardware components within a system.

One or more operating systems 410, and one or more application programs 411 are stored on one or more of the computer readable storage media 408 for execution by one or more of the processors 402 via one or more of the respective RAMs 404 (which typically include cache memory). In the illustrated embodiment, each of the computer readable storage media 408 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Client computer 102 and server computer 114 may also include a R/W drive or interface 414 to read from and write to one or more portable computer readable storage media 426. Application programs 411 on client computer 102 and server computer 114 may be stored on one or more of the portable computer readable storage media 426, read via the respective R/W drive or interface 414 and loaded into the respective computer readable storage media 408.

Client computer 102 and server computer 114 may also include a network adapter or interface 416, such as a TCP/IP adapter card or wireless communication adapter (such as a 4G wireless communication adapter using OFDMA technology) for connection to a network 428. Application programs 411 on client computer 102 and server computer 114 may be downloaded to the computing device from an external computer or external storage device via a network (for example, the Internet, a local area network or other wide area network or wireless network) and network adapter or interface 416. From the network adapter or interface 416, the programs may be loaded onto computer readable storage media 408. The network may comprise copper wires, optical fibers, wireless transmission, routers, firewalls, switches, gateway computers and/or edge servers.

Client computer 102 and server computer 114 may also include a display screen 420, a keyboard or keypad 422, and a computer mouse or touchpad 424. Device drivers 412 interface to display screen 420 for imaging, to keyboard or keypad 422, to computer mouse or touchpad 424, and/or to display screen 420 for pressure sensing of alphanumeric character entry and user selections. The device drivers 412, R/W drive or interface 414 and network adapter or interface 416 may include hardware and software (stored on computer readable storage media 408 and/or ROM 406).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
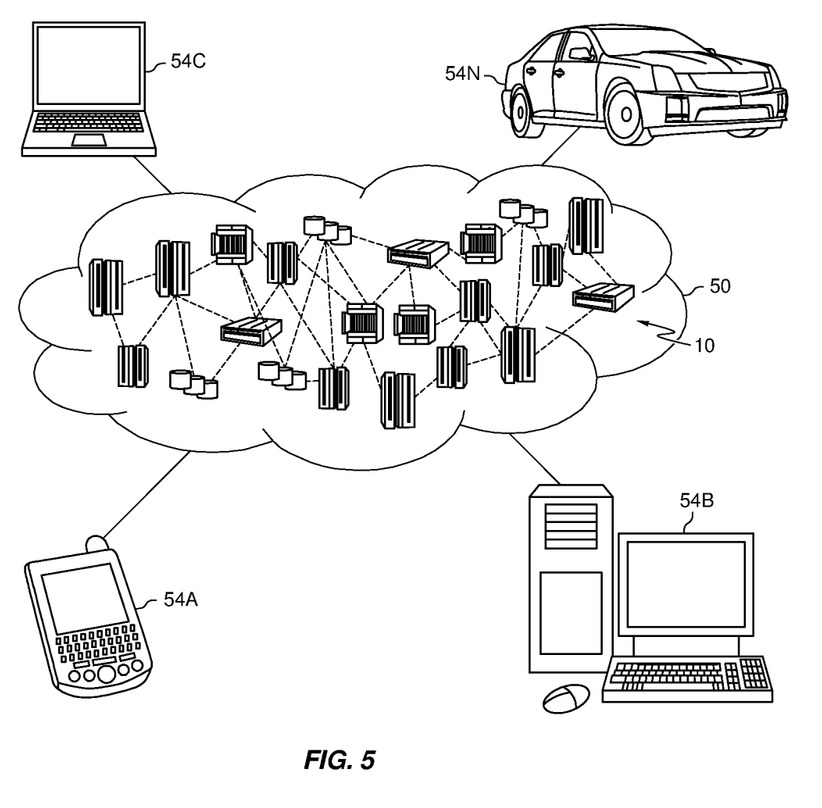
FIG. 5 is a block diagram of an illustrative cloud computing environment, according to an embodiment of the present disclosure.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
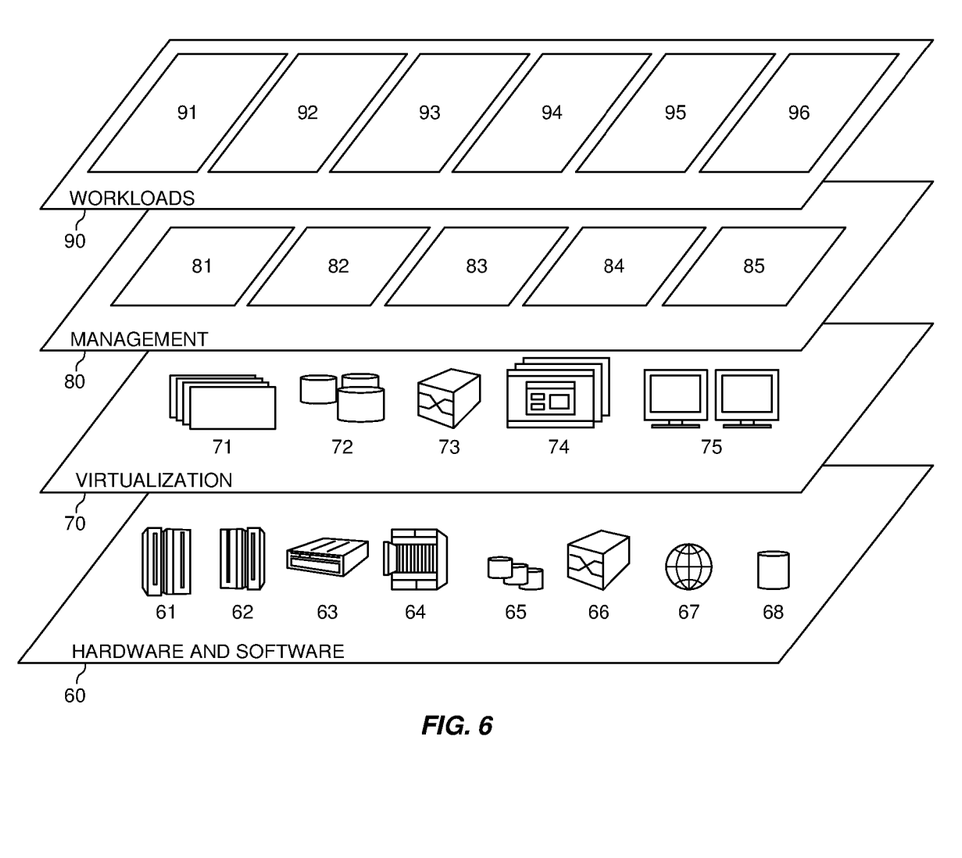
FIG. 6 is a block diagram of functional layers of the illustrative cloud computing environment of FIG. 5, according to an embodiment of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and system for automated interactive activity recognition based on keypoint detection 96.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While steps of the disclosed method and components of the disclosed systems and environments have been sequentially or serially identified using numbers and letters, such numbering or lettering is not an indication that such steps must be performed in the order recited, and is merely provided to facilitate clear referencing of the method's steps. Furthermore, steps of the method may be performed in parallel to perform their described functionality.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for interactive activity recognition, comprising:
    retrieving, by one or more processors, a temporal sequence of image frames from a video recording;
    identifying, by the one or more processors, first keypoints in each of the image frames in the temporal sequence, the first keypoints being associated with an object in the temporal sequence of image frames;
    identifying, by the one or more processors, second keypoints in each of the image frames in the temporal sequence, the second keypoints being associated with an individual interacting with the object;
    combining, by the one or more processors, the first keypoints with the second keypoints;
    extracting, by the one or more processors, spatial-temporal features from the combined first keypoints and second keypoints by using the combined first keypoints and second keypoints as input for a Graph Convolutional Neural Network (GCN) model; and
    based on the extracted spatial-temporal features, training, by the one or more processors, a classification model for recognition of interactive activities between the individual and the object.

2. The method of claim 1, wherein identifying the first keypoints further comprises:
    using, by the one or more processors, a Convolutional Neural Network (CNN) based detection model trained for identifying the first keypoints.

3. The method of claim 2, further comprising:
    using, by the one or more processors, pre-labeled data to train the CNN based detection model for identifying the first keypoints.

4. The method of claim 1, wherein identifying the second keypoints further comprises:
    using, by the one or more processors, a real-time method for multi-person pose detection in images and videos.

5. The method of claim 1, wherein a result of the GCN model comprises final first keypoints and final second keypoints.

6. The method of claim 1, further comprising:
    feeding, by the one or more processors, the spatial-temporal features to the classification model.

7. The method of claim 1, further comprising:
    identifying, by the one or more processors, a third keypoint corresponding to a sheltered keypoint.

8. The method of claim 7, wherein identifying the third keypoint further comprises:
    determining, by the one or more processors, a relationship between an $n^{th}$ frame and an $(n+1)^{th}$ frame from the temporal sequence of image frames using tracking algorithms, wherein a position of the third keypoint in the $(n+1)^{th}$ frame is determined based on a position of the third keypoint in the $n^{th}$ frame in which the third keypoint is visible.

9. A computer system for interactive activity recognition, comprising:
    one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:
    retrieving, by one or more processors, a temporal sequence of image frames from a video recording;
    identifying, by the one or more processors, first keypoints in each of the image frames in the temporal sequence, the first keypoints being associated with an object in the temporal sequence of image frames;
    identifying, by the one or more processors, second keypoints in each of the image frames in the temporal sequence, the second keypoints being associated with an individual interacting with the object;
    combining, by the one or more processors, the first keypoints with the second keypoints;
    extracting, by the one or more processors, spatial-temporal features from the combined first keypoints and second keypoints by using the combined first keypoints and second keypoints as input for a Graph Convolutional Neural Network (GCN) model; and
    based on the extracted spatial-temporal features, training, by the one or more processors, a classification model for recognition of interactive activities between the individual and the object.

10. The computer system of claim 9, wherein identifying the first keypoints further comprises:
    using, by the one or more processors, a Convolutional Neural Network (CNN) based detection model trained for identifying the first keypoints.

11. The computer system of claim 10, further comprising:
    using, by the one or more processors, pre-labeled data to train the CNN based detection model for identifying the first keypoints.

12. The computer system of claim 9, wherein identifying the second keypoints further comprises:
    using, by the one or more processors, a real-time method for multi-person pose detection in images and videos.

13. The computer system of claim 9, wherein a result of the GCN model comprises final first keypoints and final second keypoints.

14. The computer system of claim 9, further comprising:
    feeding, by the one or more processors, the spatial-temporal features to the classification model.

15. The computer system of claim 9, further comprising:
    identifying, by the one or more processors, a third keypoint corresponding to a sheltered keypoint.

16. The computer system of claim 15, wherein identifying the third keypoint further comprises:

determining, by the one or more processors, a relationship between an $n^{th}$ frame and an $(n+1)^{th}$ frame from the temporal sequence of image frames using tracking algorithms, wherein a position of the third keypoint in the $(n+1)^{th}$ frame is determined based on a position of the third keypoint in the $n^{th}$ frame in which the third keypoint is visible.

17. A computer program product for interactive activity recognition, comprising:
   one or more computer readable storage media, and program instructions collectively stored on the one or more computer readable storage media, the program instructions comprising:
   program instructions to retrieve, by one or more processors, a temporal sequence of image frames from a video recording;
   program instructions to identify, by the one or more processors, first keypoints in each of the image frames in the temporal sequence, the first keypoints being associated with an object in the temporal sequence of image frames;
   program instructions to identify, by the one or more processors, second keypoints in each of the image frames in the temporal sequence, the second keypoints being associated with an individual interacting with the object;
   program instructions to combine, by the one or more processors, the first keypoints with the second keypoints;
   program instructions to extract, by the one or more processors, spatial-temporal features from the combined first keypoints and second keypoints by using the combined first keypoints and second keypoints as input for a Graph Convolutional Neural Network (GCN) model; and
   based on the extracted spatial-temporal features, program instructions to train, by the one or more processors, a classification model for recognition of interactive activities between the individual and the object.

18. The computer program product of claim 17, wherein identifying the first keypoints and identifying the second keypoints further comprises:
   using, by the one or more processors, a Convolutional Neural Network (CNN) based detection model trained for identifying the first keypoints; and
   using, by the one or more processors, a real-time method for multi-person pose detection in images and videos for identifying the second keypoints.

19. The computer program product of claim 17, wherein a result of the GCN model comprises final first keypoints and final second keypoints.

20. The computer program product of claim 17, further comprising:
   identifying, by the one or more processors, a third keypoint corresponding to a sheltered keypoint, wherein identifying the third keypoint comprises determining a relationship between an $n^{th}$ frame and an $(n+1)^{th}$ frame from the temporal sequence of image frames using tracking algorithms, wherein a position of the third keypoint in the $(n+1)^{th}$ frame is determined based on a position of the third keypoint in the $n^{th}$ frame in which the third keypoint is visible.

* * * * *